United States Patent Office 3,240,728
Patented Mar. 15, 1966

3,240,728
POLYURETHANES CONTAINING CYCLIC
PHOSPHONITRILAMIDATES
Lars Gunnar Lund, Tampere, Finland, assignor to Albright & Wilson (Mfg.) Limited, Oldbury, near Birmingham, Warwickshire, England
No Drawing. Filed Nov. 19, 1962, Ser. No. 238,755
Claims priority, application Great Britain, Nov. 23, 1961,
41,994/61
13 Claims. (Cl. 260—2.5)

This invention relates to the preparation of polyurethane materials.

Polyurethane materials, particularly these in cellular form, are finding an increasing commercial use particularly in upholstery and for heat and sound insulation. The non-cellular materials find use as elastomers. However, polyurethane materials suffer from the disadvantage that they are combustible and, to overcome the consequent fire hazard which militates against the acceptance of them for purposes for which their other properties, such as lightness and resiliency, render them eminently suitable, many attempts have been made to render them flame-retardant. By flame-retardant is meant the tendency of the material to extinguish itself after being ignited and the flame source then removed. As the incorporation of chemically inert additives in a foam gives rise to difficulties in providing a homogeneous material and as such additives tend to migrate to the foam surface, it is desirable to impart an inherent flame retardance to polyurethane materials by inserting into the polymeric molecule some structural units the presence of which confers the desired property.

It is, therefore, an object of the present invention to produce a polyurethane material having a measure of inherent flame retardance.

Polyurethane materials are produced by reacting an organic polyhydroxy compound with an organic polyisocyanate. If a cellular polyurethane is to be produced it is preferred that this reaction should take place in the presence of water present either initially or added during the course of the reaction.

It has now been found that certain novel cyclic phosphonitrilic compounds, herein referred to as cyclic phosphonitrilamidates, also react with organic polyisocyanates and therefore that the phosphonitrile moiety can be incorporated into polyurethane materials by including the phosphonitrilamidates in the reaction mixture in which the polyurethane is produced. Such a polyurethane has now been found to possess a measure of inherent flame-retardance.

The novel phosphonitrilamidates are cyclic compounds of the overall general formula $[PN(OR)_x(NHR')_y]_n$, wherein each R is an aryl group, each R' is a hydrogen atom or an alkyl or aryl group, $x$ and $y$ are positive numbers which may be fractional, such that $x+y=2$, and $n$ is an integer of from 3 to 17. These phosphonitrilamidates constitute the invention of copending application No. 238,744, filed November 19, 1962, and now issued as Patent No. 3,206,494.

Accordingly, the present invention provides a process for the production of a polyurethane material, which comprises interacting an organic polyhydroxy compound, an organic polyisocyanate and from 1 to 20% by weight based on the weight of the polyhydroxy compound of a cyclic phosphonitrilamidate of the overall general formula $[PN(OR)_x(NHR')_y]_n$, wherein each R is an aryl group (preferably a mononuclear aryl group optionally containing alkyl and/or chlorine substituents), each R' is a hydrogen atom or an alkyl or aryl group (preferably a hydrogen atom), $x$ and $y$ are positive numbers which may be fractional such that $x+y=2$ (preferably $y$ has a value between 0.6 and 1.1), and $n$ is an integer of from 3 to 17 (preferably 3 or 4).

The novel phosphonitrilamidates may be prepared (as described in the said copending application) by one of two general processes. Thus, a cyclic phosphonitrilic halide of the general formula $[PNX_2]_n$, wherein each X is a chlorine, bromine or fluorine atom and $n$ is an integer of from 3 to 17 (preferably each X is a chlorine atom and $n$ is 3 or 4), is successively reacted *in either order* with: (1) one or more metal aroxides; and (2) ammonia or a primary aliphatic or aromatic amine, the reactions being carried out in the presence of an inert liquid diluent, and the first of the two stages being carried out with such an amount of the aroxide, ammonia or amine as the case may be or under such conditions that reaction does not occur with all the halogen atoms in the phosphonitrilic halide.

Thus the preparation of the phosphonitrilamidates involves the successive reaction carried out in either order of partial esterification and amination of the halogen atoms in the phosphonitrilic halidates of the general formula $[PN(OR)_xX_y]_n$ or cyclic phosphonitrilic amidohalides of the general formula $[PN(NHR')_yX_x]_n$, wherein each R, R', X, $x$, $y$ and $n$ have the significance given previously. The route involving production of the phosphonitrilic halidates is preferred.

The preferred phosphonitrilamidates for present use are those of the above overall general formula in which R is a mononuclear aryl group optionally containing alkyl and/or chlorine substituents, each R' is a hydrogen atom, $y$ has a value between 0.6 and 1.1 and $n$ is 3 or 4. Such compounds are prepared from a cyclic phosphonitrilic halide trimer or tetramer, especially from the chlorides since these are the most readily obtainable starting materials, by the successive processes carried out in either order, of partial esterification and partial amination. Those preferred phosphonitrilamidates are prepared by partial esterification with an aroxide, preferably an alkali-metal aroxide, which is derived from a mononuclear phenol which can contain alkyl and/or chlorine substituents, for instance phenol, cresols, xylenols and chlorinated phenol, cresols and xylenols; followed or preceded by partial amination with ammonia. It is preferred that this partial esterification and amination are each carried out to an extent such that the values of $x$ and $y$ in the said general formula are in the ranges 1.4 to 0.9 and 0.6 to 1.1 respectively; particularly preferred are the phosphonitrilamidates in which the amino and aroxy substituents are each present in substantially equimolar proportions, that is $x$ and $y$ each lie between 0.9 and 1.1.

The novel phosphonitrilamidates are normally coloured viscous liquids though in some instances they may be solids. They may not be distilled without decomposition, but may usually be purified by fractional crystallisation from a suitable solvent, for example benzene, hexane, or chloroform.

Although the amount of phosphonitrilamidate employed in the production of the present polyurethane materials should be between 1 and 20% by weight based on the total weight of polyhydroxy compound employed; the optimum amount is normally within the range of from 4 to 10% by weight.

The polyurethane material of the invention is produced by reacting the polyisocyanate with the polyhydroxy compound and the phosphonitrilamidate making use of techniques for producing polyurethane materials in various forms such as elastomers and foams which have been described in the literature. Preferably a polyurethane foam is produced by the use of a small controlled amount of water as foaming agent. As is well known the water may be added initially with the other ingredients of the reaction mixture or subsequently to a prepolymer prepared from the polyhydroxy compound and polyisocyanate optionally together with a further amount of the polyhydroxy compound or polyisocyanate. The foams may be made by continuous or discontinuous mixing methods and may, if desired, be subjected to a heat treatment as an after-cure. The foaming may be assisted by a blowing agent, for example by the use of a low-boiling liquid such as a fluorinated methane. The resulting foam may be rigid, semi-rigid or flexible depending mainly on the nature and amount of the polyhydroxy compound employed.

The polyisocyanate employed is normally a diisocyanate and those commonly employed are aromatic diisocyanates, such as toluene and diphenylmethane diisocyanates.

The polyhydroxy compounds for present use, which can be used singly or in admixture, are preferably polyethers, polyesters or polyesteramides each containing at least two hydroxy groups, that is having a hydroxyl functionality of at least 2, and preferably having a molecular weight of at least 400. As polyethers there may be employed condensation products of an alkylene oxide with a nucleating compound which is itself a compound, having from 2–4 functional groups, usually a hydroxy compound, so that the preferred polyethers have a hydroxyl functionality of from 2 to 4. The polyether is preferably a polypropylene ether glycol or a condensation product of propylene oxide with a tri- or tetra-functional nucleating compound such as glycerol, trimethylolpropane, hexanetriol or pentaerythritol, the glycol or condensation product desirably having a molecular weight of 1,000 to 4,000. Other suitable polyethers include mixed condensasation products of propylene and ethylene oxides, either with themselves or with a nucleating compound, and polymers of tetrahydrofuran. The polyesters are normally esters of glycols and/or glycerol, trimethylolpropane or pentaerythritol with dicarboxylic acids such as adipic, phthalic or maleic acids, singly or in admixture. The polyesters have at least two free hydroxyl groups and preferably have a hydroxyl functionality of from 2 to 4.

The production of the polyurethane materials is preferably carried out in the presence of catalysts and surface-active agents as is known in the art. Of particular value is the use of tertiary amines, organotin compounds and tin carboxylate salts as catalysts and modified organosiloxane polymers (silicones) containing oxyalkylene groups as cell-controlling agents.

The invention will now be illustrated by the following examples:

Example 1

A cyclic phosphonitrilamidate of approximate formula [PN(OC$_6$H$_5$)(NH$_2$)]$_3$ was prepared by reacting cyclic phosphonitrilic chloride trimer with the appropriate quantity of sodium phenate, followed by reaction with gaseous ammonia. This product (23 g.) was mixed with toluene diisocyanate (48.6 g.) and dibutyltin dilaurylmercaptide (0.41 g.) as catalyst and then reacted with a polypropylene glycol of molecular weight approximately 3,000. The polyurethane polymer which was produced reached a viscosity of 2,500 cp. after 16 minutes reaction as compared to 20 minutes in a comparative experiment in which the phosphonitrilamidate was omitted. This prepolymer was then further reacted with water to produce a flexible polyurethane foam which was shown to be inherently flame-retardant.

Example 2

A phosphonitrilamidate (17 g.) approximately to the formula [PN(OC$_6$H$_4$Cl)(NH$_2$)]$_3$ which had been prepared in a similar fashion to the phosphonitrilamidate used in Example 1 except that sodium p-chlorophenate replaced the sodium phenate was reacted with toluene diisocyanate (54 g.) and polypropylene glycol (400 g.) of approximate molecular weight 3000 in the presence of a catalyst (0.4 g.) as in Example 1. The resulting prepolymer had a viscosity of 2500 cp. after 13 minutes and this was converted into a flame-retardant flexible polyurethane foam by treatment with water.

Example 3

A phosphonirtilamidate (20 g.) of approximate formula [PN(OC$_6$Cl$_5$)(NH$_2$)] (which had been prepared by reacting cyclic phosphontrilic chloride trimer successively with sodium pentachlorophenate and ammonia) was reacted with toluene diisocyanate (47 g.) and the polypropylene glycol (400 g.) of molecular weight approximately 3000, in the presence of dibutyltin dilaurylmercaptide (0.4 g.) as catalyst. The resulting polyurethane prepolymer reached a viscosity of 2500 cp. after 12½ minutes and this was afterwards reacted with water to produce a flexible polyurethane foam having flame-retardant properties.

Example 4

A cyclic phosphonitrilamidate approximating to the formula [PN(OC$_6$H$_5$)(NH$_2$)] was prepared as in Example 1. A solution of this compound (8 g.) in methylene chloride (8 g.) was mixed in a 400 ml. beaker with a polypropylene glycol (160 g.) of approximate molecular weight 3000 and with a modified silicone (2.4 g.) as cell-controlling agent. Toluene diisocyanate (78 g.) was then added and the mixture stirred until homogeneous, whereupon there was added a catalyst mixture of dibutyltin dilaurylmercaptide (0.24 g.) triethylenediamine (0.4 g.) and N-ethylmorpholine (0.8 g.) together with water (4.8 g.). Mechanical stirring of the reaction mixture was continued until foaming commenced when it was tipped into a large mould. A good foam rise occurred and the polyurethane foam so produced was tough and resilient and had a fine structure. This foam was shown to have flame-retardant properties.

Example 5

Phosphonitrilic chloride trimer (46 g.) was reacted with sodium p-chlorophenate (40 g.) in chloroform to produce a phosphonitrilic chloride of the approximate formula [PN(OC$_6$H$_4$Cl)$_x$Cl$_y$]$_3$ where $x=0.67$ and $y=1.33$. This compound was not isolated from solution and sodium pentachlorophenate (62 g.) was then added to the reaction mixture. Gaseous ammonia was thereafter passed into the reaction mixture for 2 hours, the precipitated sodium and ammonium chlorides filtered off and the solvent then removed by distillation under reduced pressure to produce a phosphonitrilamidate approximating to the formula

[PN(OC$_6$H$_4$Cl)$_p$(OC$_6$Cl$_5$)$_q$(NH$_2$)$_y$]$_3$ where $p$, $q$ and $y$ are each approximately 0.67.

This phosphonitrilamidate (20 g.) was dissolved in a polypropylene glycol (400 g.) of approximate molecular weight 3000 together with a modified organosiloxane containing oxyethylene groups (4 g.) and the mixture placed in a 500 ml. beater. Toluene diisocyanate (161 g.) was added to the mixture which was stirred until homogeneous. There was then added a catalyst mixture of dibutyltin dilaurylmercaptide (0.4 g.), N-ethylmorpholine (2 g.) and triethylenediamine (1 g.) together with water (12 g.). A good foam rise occurred and the polyurethane foam produced by this technique was tough and resilient though coarse in texture. The foam produced was inherently flame-retardant.

What I claim is:

1. In a process for the production of a polyurethane material involving the interaction of an organic polyhydroxy compound selected from the group consisting of polyethers and polyesters each having a hydroxyl functionality of from 2 to 4 and a molecular weight of at least 400 with an organic polyisocyanate, the improvement which consists in interacting also a cyclic phosphonitrilamidate of the formula [PN(OR)$_x$(NH$_2$)$_y$]$_n$, wherein each R is selected from the group consisting of phenyl, chlorophenyl, tolyl, chlorotolyl, xylyl, and chloroxylyl, 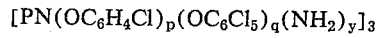

$x$ and $y$ are positive numbers such that $x+y=2$, and $n$ is an integer of from 3 to 17, the phosphonitrilamidate being present in an amount of from 1 to 20% by weight based on the weight of the polyhydroxy compound.

2. A process as claimed in claim 1, in which in the said general formula for the phosphonitrilamidate, $y$ has a value between 0.6 and 1.1, and $n$ is an integer of from 3 to 4.

3. In a process for the production of a polyurethane foam involving the interaction of an organic polyhydroxy compound selected from the group consisting of polyethers and polyesters each having a hydroxyl functionality of from 2 to 4 and a molecular weight of at least 400 with an organic polyisocyanate and a small controlled quantity of water, the improvement which consists in interacting also a cyclic phosphonitrilamidate of the formula $PN(OR)_x(NH_2)_{yn}$, wherein each R is selected from the group consisting of phenyl, chlorophenyl, tolyl, chlorotolyl, xylyl, and chloroxylyl, $x$ and $y$ are positive numbers such that $x+y=2$, and $n$ is an integer of from 3 to 17, the phosphonitrilamidate being present in an amount of from 1 to 20% by weight based on the weight of the polyhydroxy compound.

4. A process as claimed in claim 3, in which in the said general formula for the phosphonitrilamidate, $y$ has a value between 0.6 and 1.1, and $n$ is an integer of from 3 to 4.

5. A process as claimed in claim 4, in which the said organic polyhydroxy compound is a polyether which has a hydroxyl functionality of from 2 to 4, is a condensate of propylene oxide and has a molecular weight of from 1,000 to 4,000.

6. In a process for the production of a polyurethane foam involving the interaction of an organic polyhydroxy compound selected from the group consisting of polyethers and polyesters each having a hydroxyl functionality of from 2 to 4 and a molecular weight of at least 400 with an organic polyisocyanate and a small controlled quantity of water, the improvement which consists in interacting also a cyclic phosphonitrilamidate of the formula $[PN(OR)_x(NH_2)_y]_n$, wherein each R is selected from the group consisting of phenyl, chlorophenyl, tolyl, chlorotolyl, xylyl, and chloroxylyl, $x$ and $y$ each have a value between 0.9 and 1.1 such that $x+y=2$ and $n$ is 3, the phosphonitrilamidate being present in an amount of from 1 to 20% by weight based on the weight of the polyhydroxy compound.

7. A process as claimed in claim 6, in which each R is selected from the group consisting of phenyl and chlorinated phenyl groups.

8. A process as claimed in claim 6, in which the cyclic phosphonitrilamidate is present in an amount of from 4 to 10% by weight based on the weight of the polyhydroxy compound.

9. A process as claimed in claim 6, in which the polyhydroxy compound is a polyether which has a hydroxyl functionality of from 2 to 4, is a condensate of propylene oxide and has a molecular weight of from 1,000 to 4,000.

10. A cellular polyurethane comprising the reaction product of
(i) at least one organic polyhydroxy compound selected from the group consisting of polyethers and polyesters each having a hydroxyl functionality of from 2 to 4 and a molecular weight of at least 400,
(ii) an aromatic diisocyanate,
(iii) a cyclic phosphonitrilamidate of the formula $$[PN(OR)_x(NH_2)_y]_n$$

in an amount from 1% to 20% by weight of said polyhydroxy compound, wherein each R is selected from the group consisting of phenyl, chlorophenyl, tolyl, chlorotolyl, xylyl, and chloroxylyl, $x$ and $y$ are positive numbers and $x$ plus $y$ equal 2, and $n$ is an integer from 3 to 17, and
(iv) a blowing agent.

11. The product of claim 10 wherein $x$ and $y$ each have a value between 0.6 and 1.1.

12. The product of claim 11 wherein R is phenyl.

13. The product of claim 11 wherein R is chlorophenyl.

References Cited by the Examiner

UNITED STATES PATENTS

| | | | |
|---|---|---|---|
| 2,192,921 | 3/1940 | Lipkin | 260—461 |
| 2,214,769 | 9/1940 | Lipkin | 260—2 |
| 3,058,941 | 10/1962 | Birum | 260—30.6 |

OTHER REFERENCES

Moeller et al.: "High Polymeric Materials," Illinois University Dept. of Chemistry and Chemical Engineering (1961).

DONALD E. CZAJA, *Primary Examiner.*

LEON J. BERCOVITZ, *Examiner.*